Jan. 7, 1969     D. H. YOUNGMAN     3,420,384

ARTICLE TRANSFERRING MECHANISM

Filed May 17, 1966

Inventor
Derek Henry Youngman

Watson, Cole, Grindle & Watson
Attorneys

United States Patent Office 3,420,384
Patented Jan. 7, 1969

3,420,384
ARTICLE TRANSFERRING MECHANISM
Derek Henry Youngman, London, England, assignor to Molins Machine Company Limited, London, England, a corporation of Great Britain
Filed May 17, 1966, Ser. No. 550,657
Claims priority, application Great Britain, May 20, 1965, 21,406/65
U.S. Cl. 214—1
Int. Cl. B25j 3/00; B65g 47/00
7 Claims

ABSTRACT OF THE DISCLOSURE

An article transfer mechanism is described comprising an arm rotatable at constant angular velocity about a fixed axis, an article carrier slidably mounted on the arm and cam operted to move radially relative to the fixed axis, thereby to alter its linear velocity, and a rack and pinion arrangement which rotates the carrier during its angular and radial movement.

---

This invention concerns improvements relating to a mechanism used for transferring articles moving in one direction at one speed to a position in which they move in a second direction at another speed.

With the increase in mechanisation and speed of production the requirements of receiving articles manufactured or processed on a machine and transferring them, e.g. to a further machine for additional processing, have been intensified. For instance, articles (e.g. cigarettes in a container) may be packed on one machine and then be transferred to a further machine in which they may be wrapped in a moisture protective skin. Layout considerations may dictate that the two machines cannot be simply linked together and it may be necessary for the articles leaving the first machine to be directed in a second direction so as to be correctly oriented before entering the second machine. The spacing between subsequent articles may have to be altered, different spacing being the same as altering the speed or velocity of the articles for the same total throughput. A final requirement may be for the articles to be given a changed orientation relative to their direction of movement.

A further example is to be found in the delivery of cigarettes from a continuous rod cigarette machine in which a continuous cigarette rod, travelling axially at high speed, is cut into cigarette lengths. The usual practice is to deflect the cigarettes sideways as they come from the cut-off mechanism, which involves a rapid checking of their axial movement, as well as a change in their direction of movement in order to form them into a row, or two rows, of sideways moving cigarettes as is usually the practice. Rapid deceleration of cigarettes moving axially at high speed may cause damage to the cigarettes; for example the leading end of a cigarette may be damaged by impact against a stop, or the tobacco may tend to move axially relatively to its paper wrapper.

According to the invention there is provided a transfer mechanism for articles, comprising a carrier arranged for movement in a curved path and adapted to receive an article and convey it in said path, and means to rotate the article during said movement so as to change the orientation of said article. The article may be rotated through substantially 90°, whereby articles received by said carrier while travelling lengthwise, i.e. in the direction of their longitudinal axes, can be delivered therefrom while travelling sideways, i.e. transversely to said axes. The carrier may be caused to move about a fixed centre at a constant angular velocity, the mechanism including means to cause the carrier to move radially so as to change its linear velocity.

The mechanism may comprise an arm rotating about a fixed centre at constant angular velocity, a member attached to and slidable radially along the arm and means to cause the member to which the carrier is attached to follow a path eccentric to the fixed centre.

The said means to cause the member to move radially may comprise a cam track positioned in a plane parallel to that of the rotatable arm and a cam roller fixed to the member and constrained to follow the cam track which is eccentrically disposed to the fixed centre.

Rotating means may be provided to rotate the carrier about an axis parallel to the axis of the arm. The carrier may be pivotably mounted on a bracket fixed to the arm. The rotating means may comprise a pinion fixed to the carrier, a rack meshing with the pinion and slidable relatively to the bracket due to the action of a second cam fixed to the arm and of a cam follower fixed to the rack.

Apparatus in accordance with the invention will now be described by way of example with reference to the accompanying drawings in which.

Figure 1:
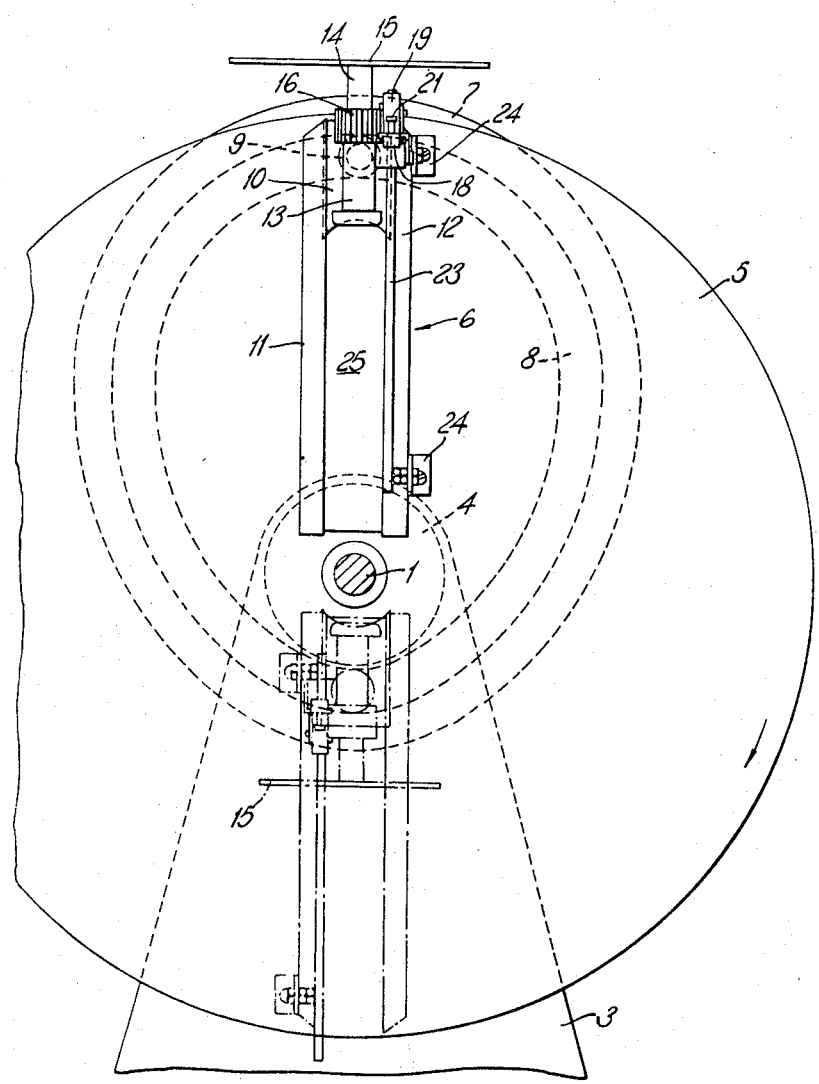
FIGURE 1 is an end view of a carrier turning apparatus.
Figures 2, 3:
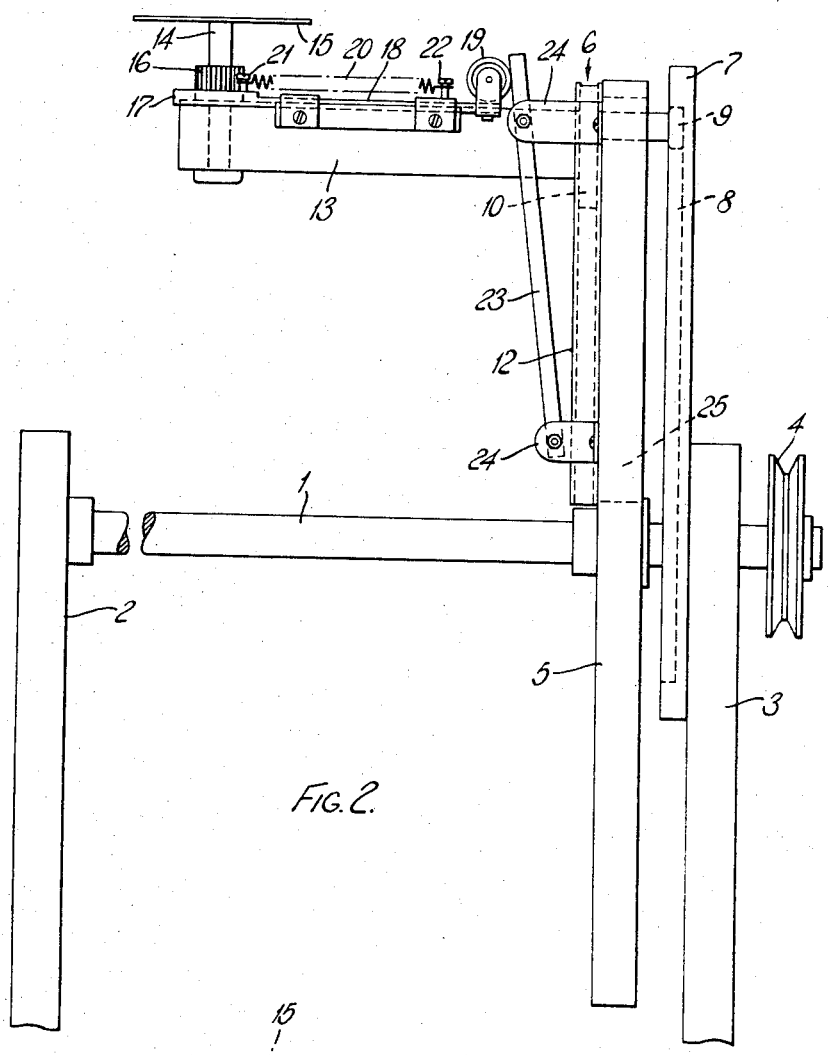
FIGURE 2 is a side view of the apparatus of FIGURE 1.
FIGURE 3 is a plan of the same apparatus.

Referring to FIGURES 1 and 2, a shaft 1 is journalled in brackets 2 and 3 and is driven by means of pulley 4. Keyed to the shaft 1 is a disc 5 having fixed thereto an arm shown generally as 6. The disc 5 is provided with a slot 25. Fixed to the bracket 3 is a box cam 7 having a track 8 in which a cam roller 9 can move. The cam roller 9 is joined to a member 10 which is slidable in a radial direction between two slides 11 and 12 of the arm 6.

Attached to the member 10 is a cantilevered arm 13 having a vertical shaft 14 passing through its free end. The shaft 14 terminates at its upper end in a carrier 15 which in this case is shown diagrammatically as a flat plate. The carrier 15 can of course be any shape and the article to be transferred can be held thereto by suction, magnetically or by any other known means. A pinion 16 fixed to the shaft 14 engages with a rack 17 which is part of a bar 18 having at its opposite end a roller 19. The rack 17 is urged to the right as seen when locking at FIGURES 2 and 3 by a spring 20 which is held in tension between posts 21 and 22 located on the bar 18 and the arm 13 respectively. The roller 19 rotates against a cam face 23 fixed by brackets 24 to the disc 5.

The apparatus operates as follows. The pulley causes the shaft 1 to rotate at constant angular velocity in the direction shown by the arrow. Thus the disc 5 and the cam roller 9 also rotate at constant angular velocity. This rotation causes the cam roller 9 to follow the cam track 8 in the stationary box cam 7. The track 8 is eccentrically disposed about the axis of the shaft 1 and the distance of the cam roller 9 from this same axis varies. As the distance varies so the linear velocity changes since the angular velocity is constant.

In FIGURE 1 the carrier 15 is shown in two positions. The full line position indicates the loading position for an article moving to the right in the plane of the paper. The arm 6 rotates with the disc 5 and as it does the cam roller 9 follows the track 8 in a path that moves progressively nearer the axis of the shaft 1 until the carrier 15 reaches the position shown in chain lines where the article is off-loaded. As the cam roller 9 approaches this axis the member 10 slides within the two slides 11 and 12 so that at the off-loading position the carrier 15 is moving at minimum linear velocity in the opposite direction to which it was moving in the loading position. The off-loading position in the embodiment shown is as described but it could equally well be at any other desired position within the limits of the apparatus. Although the apparatus in the embodiment is disposed for rotation of the disc 5 in a vertical plane this is not a necessary limitation. The same or similar apparatus can readily be adapted for rotation in a horizontal plane.

In the apparatus shown the carrier 15 is also rotated about the shaft 14 through an angle of 90°. As the member 10 and the attached cantilevered arm 13 start to move radially inwards the roller 19 starts to move towards the disc 5 due to the spring 20 holding it against the cam face 23. Since the roller 19 is attached to the bar 18, the latter also moves towards the disc 5 and in so doing causes the rack 17 to rotate the pinion 16. The design of the cam face 23, rack 17 and the pinion 16 is such that for the full inward radial travel of the member 10, the shaft 14 is rotated through 90°. Changes in the design data would lead to rotation through any desired angle during the carrier's movement from its loading position to its off-loading position.

Although only one arm 6 is shown the invention is not so restricted. Any number of arms disposed about the shaft 1 can be accommodated within the limits imposed by the size of the apparatus. Each arm can be provided with a separate carrier and the separate carrier will then pass one after another from the loading position to the off-loading position.

As mentioned above, the apparatus may be used for receiving articles such as cigarette packets from one machine and transferring or directing them to a further machine; e.g. it may receive packets from a packing machine and transfer them to a wrapping machine. As a further example, the articles received may be cigarettes as they move axially in succession away from the cutoff mechanism of a continuous rod cigarette-making machine. As is well known in the cigarette-making art, it is customary for cigarettes coming from the cut-off mechanism to be deflected sideways, either singly or in pairs, so as to form a single or double row of cigarettes moving laterally in a direction at right angles to the direction of their original axial movement. Since in modern cigarette-making machines the cigarettes coming from the cut-off travel at high speed, difficulty is experienced in checking their axial flight without damage to the cigarettes. For example, a sudden change of velocity may tend to result in axial movement of the tobacco in a cigarette relatively to its paper wrapper. The arrangement according to the present invention can readily be adapted for receiving cigarettes, the carriers 15 being suitably shaped and arranged for this purpose, and a sufficient number of arms 6 and carriers 15 being provided to handle the cigarettes in rapid succession. It will be seen that the invention not only provides a means of gradually decelerating the cigarettes without any violent change of motion, but also provides a way of changing the orientation of the cigarettes by rotating them through 90°, so that by the time they have reached their delivery position they are travelling sideways. This rotation of the cigarettes through 90° or through any other desired angle such as 180° could, of course, be effected quite soon after they are received on their carriers, so that during the greater part of the time while they are being decelerated they are travelling sideways, thus reducing the risk of lengthwise displacement of tobacco within the wrapper of a cigarette as mentioned above.

What I claim as my invention and desire to secure by Letters Patent is:

1. A transfer mechanism for articles, comprising a carrier adapted to receive an article, means, including a rotatably mounted arm and means for securing said carrier to said arm, for moving said carrier about a fixed axis at a constant angular velocity, means, including a member slidably attached to said arm and means to cause said member to move radially relative to said fixed axis, to cause the carrier to move radially so as to change its linear velocity, and rotatable means to rotate said carrier during its angular and radial movement.

2. A transfer mechanism as claimed in claim 1, wherein the means to cause the member to move radially comprise a cam track positioned in a plane parallel to that of the rotatable arm and eccentrically disposed with respect to said fixed axis, and a cam roller fixed to the member and constrained to follow the cam track.

3. A transfer mechanism as claimed in claim 1, wherein said means for securing said carrier to said arm comprises a pivotally mounted bracket.

4. A transfer mechanism as claimed in claim 3, wherein the rotatable means comprises a pinion fixed to the carrier, a rack meshing with the pinion, a second cam fixed to the arm and a cam follower fixed to the rack, the action of the second cam causing the rack to slide relatively to the bracket.

5. A transfer mechanism for articles, comprising a substantially rigid carrier adapted to receive an article, means for mounting said carrier for bodily rotation about a single axis, means to continuously move said carrier and mounting means through 360° about a fixed axis at a constant angular velocity, said fixed axis being different from said single axis, means to simultaneously cause said carrier and mounting means to move radially relative to said fixed axis so as to change the linear velocity of said carrier, and rotatable means to rotate said carrier about said single axis during its angular and radial movement whereby said articles are reoriented and then discharged at a location other than that where articles are received.

6. A transfer mechanism for articles as claimed in claim 5 wherein said single axis about which rotates said carrier is perpendicular to said fixed axis.

7. A transfer mechanism as claimed in claim 6 wherein said rotatable means to rotate said carrier is capable of rotating it through substantially 90°, whereby an article received by said carrier while travelling lengthwise is delivered therefrom while travelling sideways.

References Cited

UNITED STATES PATENTS

| | | | |
|---|---|---|---|
| 2,215,735 | 9/1940 | Jones | 214—52 |
| 3,007,097 | 10/1961 | Shelley et al. | 214—1 XR |
| 3,220,566 | 11/1965 | Rowe | 214—1 |
| 3,184,038 | 5/1965 | Petchuk. | |

FOREIGN PATENTS 805,023  5/1951  Germany.

GERALD M. FORLENZA, *Primary Examiner.*

F. E. WERNER, *Assistant Examiner.*